United States Patent [19]

Hallman et al.

[11] 3,740,719

[45] June 19, 1973

[54] INDIRECT ADDRESSING APPARATUS FOR SMALL COMPUTERS

[75] Inventors: Beverley G. Hallman, Ottawa 6, Ontario; Robert M. Thomas, Westhill, 780, Ontario, both of Canada

[73] Assignee: GTE Automatic Electric Laboratories, Inc., Northlake, Ill.

[22] Filed: Dec. 29, 1970

[21] Appl. No.: 102,413

[52] U.S. Cl. .............................................. 340/172.5
[51] Int. Cl. ............................................... G06f 3/00
[58] Field of Search ............................... 179/18 ES; 340/172.5

[56] References Cited

UNITED STATES PATENTS

| | | | |
|---|---|---|---|
| 3,618,031 | 11/1971 | Kennedy et al. | 340/172.5 |
| 3,618,037 | 11/1971 | Wollum et al. | 340/172.5 |
| 3,462,743 | 8/1969 | Milewski | 340/172.5 |
| 3,614,741 | 10/1971 | McFarland, Jr. et al. | 340/172.5 |
| 3,614,746 | 10/1971 | Emmasingel | 340/172.5 |

OTHER PUBLICATIONS

7080 Data Processing Machine–Reference Manual, pp. 25–35, 39–41, 45–50, A22–6560–1, 1961; IBM Corp., Poughkeepsie, N.Y.

*Primary Examiner*—Harvey E. Springborn
*Attorney*—Theodore C. Jay, Jr., K. Mullerheim and B. E. Franz

[57] ABSTRACT

An indirect addressing network for a program controlled digital data processing system is disclosed. The digital data processing system includes a first set of storage devices used as directory number storage registers, and a second set of storage devices used as equipment number storage registers, all of which are indirectly addressed. The indirect addressing network includes control gates connected to each of the storage devices for partially addressing each storage device. A special gate, having a unique address, is coupled to all of the control gates for supplying the remaining portion of the address for the storage devices. When the special gate is addressed and enabled, it therefore supplies a common address component to each of the control gates, permitting a selected one of the storage devices to be addressed.

3 Claims, 15 Drawing Figures

Patented June 19, 1973 3,740,719

14 Sheets-Sheet 1

INVENTORS
BEVERLEY G. HALLMAN
ROBERT M. THOMAS
BY Bernard E. Franz
ATTORNEY

Patented June 19, 1973 3,740,719

14 Sheets-Sheet 7

INDIRECT ADDRESSING APPARATUS FOR SMALL COMPUTERS

BACKGROUND OF THE INVENTION

1. Field of the Invention

This invention relates to indirect addressing apparatus for a small computer, particularly for use in a real-time-control data processing system.

2. Description of the Prior Art

In data processing systems, in particular real-time-control systems such as telephone switching systems, there are many situations in which a plurality of memory stores are associated with identical units having identical functions. For example, in a telephone switching system with a central processor control, there are memory locations for each of the dialing registers. The processing frequently requires that one of these units calling for service or available for use be selected and a number of operational functions performs under the control of the stored program. However, the memory locations associated with the several units must have individual addresses. In the program the address of a particular unit for a particular function must be identified, for example, if particular data is to be stored therein. It would be possible to write a program having a separate segment for each of the units, but this would clearly require an excessive number of instructions. The same segment of program could be used if a method of incrementing the address numbers and having a program loop were provided. Instruction modification such as by index registers could be used for this purpose, but in a small system this might require an undue amount of hardware and also of processing time.

Many large data processing systems are provided with some form of indirect addressing. In the usual case, the instruction may use any address as an operand with indirect addressing, the effective address being stored at the address indicated by the operand. There may be one bit of the instruction reserved as an indirect address indicator for this function. Thus execution of the instruction requires first that the instruction word be read from memory, another read operation is required to obtain the effective address from the operand location, and then the processor may process with the operation indicated by the operation code of the instruction. Thus at least one additional read cycle is required to perform the instruction as compared to the situation using a direct address as the operand. There is also various hardware required for performing the indirect address operation.

SUMMARY OF THE INVENTION

In a particular embodiment of the invention several temporary memory locations comprise bistable devices such as flip-flops, each store having input gates which are enabled by an individual special control gate in response to a signal supplied in response to an instruction having a store operation code, the operand portion of the instruction being an address which is decoded from a memory output register to select the input control gate of the corresponding store. One individual one of these stores (SB) is permanently assigned to store the address of a selected store of the set of units, and the device mentioned above is a special control gate which is enabled during the store operation when its individual address is in the memory output register, to supply a signal to the input control gates of all of the stores of the set, and the particular store is selected in accordance with the address in the individual store (SB).

CROSS-REFERENCES TO RELATED APPLICATIONS

This invention is related to the Small Exchange Stored Program Switching System by R. W. Duthie and R. M. Thomas disclosed in U.S. Pat. No. 3,487,173 issued Dec. 30, 1969. The memory arrangement of the system, and particularly the storage readout circuits SR for reading from temporary memory stores is disclosed in the U.S. patent application Ser. No. 883,062 filed Dec. 8, 1969 now U.S. Pat. No. 3,587,070 issued June 22, 1971 by R.M. Thomas for a Memory Arrangement Having Both Magnetic-Core and Switching-Device Storage with a Common Address Register. The arrangement using the SCAN operation code disclosed herein is covered by U.S. patent application Ser. No. 102,414 filed Dec. 29, 1970 by J. P. Dufton and B. G. Hallman for Shift Apparatus for Small Computer. The use of the registers, senders, and ANI stores for outgoing calls is covered by U.S. patent application Ser. No. 192,828 filed Oct. 27, 1971 by J. P. Dufton for Stored Program Small Exchange with Registers and Senders.

DETAILED DESCRIPTION

Figure 1:
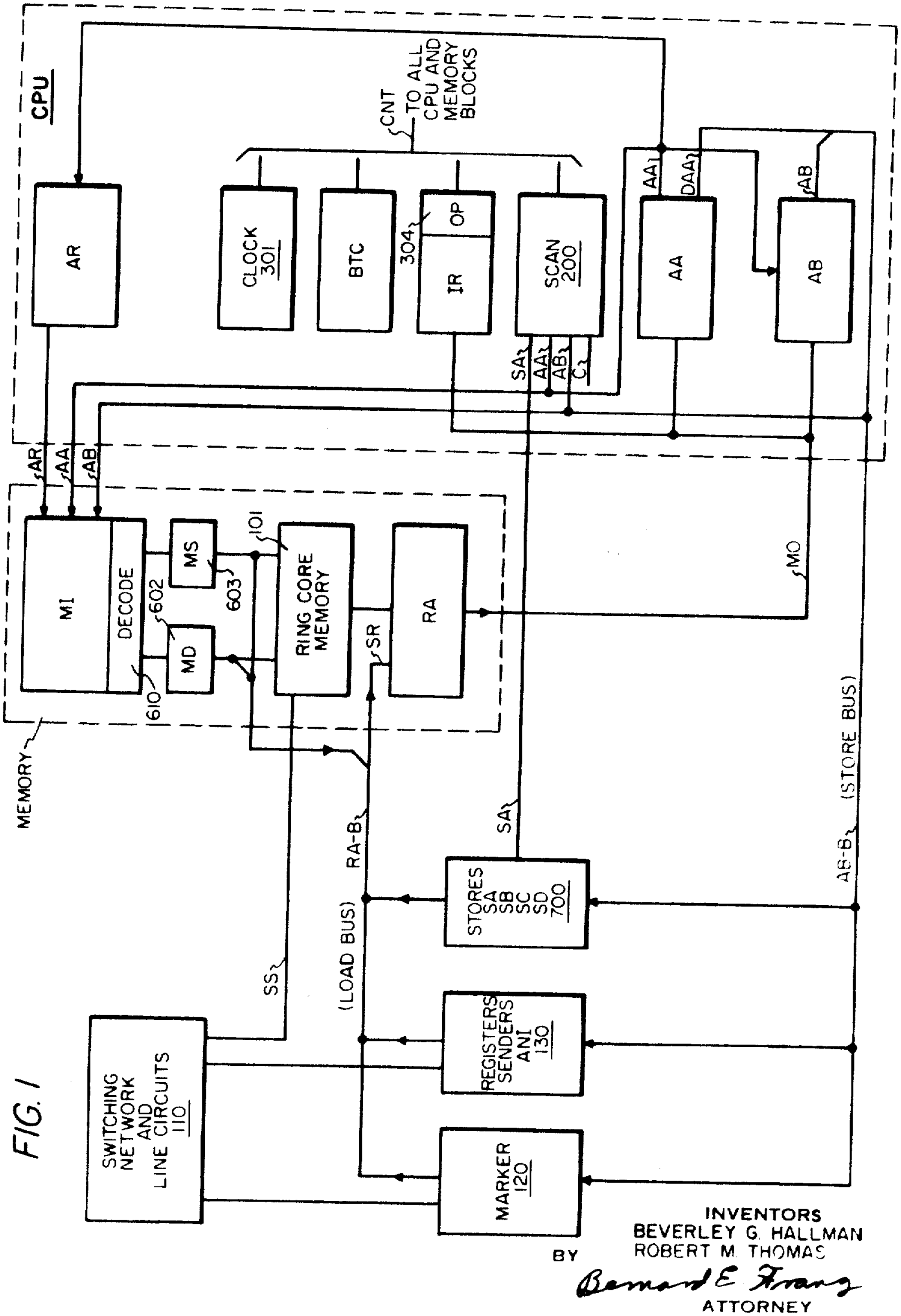
FIG. 1 is a block diagram of a telephone switching system, showing particularly the central processing unit, the memory, and subsystems which include temporary memory registers.

As shown in the block diagram of FIG. 1, the data processing system includes a memory and a central processing unit CPU. The central processing unit includes a clock 301 for supplying the basic timing signals, a bit time counter BTC which supplies the signals for the operation cycle for each instruction, an instruction register IR with an operation code (OP) decoder 304 which supplies the operation code for controlling the logic circuits, accumulator registers AA and AB, an address register AR and a SCAN unit 200.

The memory subsystem comprises basically a ring-core memory 101, with a memory input register MI having decoding circuits 610 for supplying input signals to memory drivers 602 and memory switches 603, and output read amplifiers RA. Storage registers (SA, SB, SC and SD) 700 may be considered to be part of the central processing unit, and are connected to the memory drivers and memory switches, and to the read amplifiers to form a portion of the temporary memory for the system.

The data processing system forms part of a telephone switching system to control a switching network and line circuits 110. A marking 120 contains registers forming part of the temporary memory of the system, and has circuits for controlling the switching network 110. The system also includes registers, senders and ANI (Automatic Number Identification) units 130 which also include registers forming part of the temporary memory, and have connections to the switching network 110.

Figure 6:
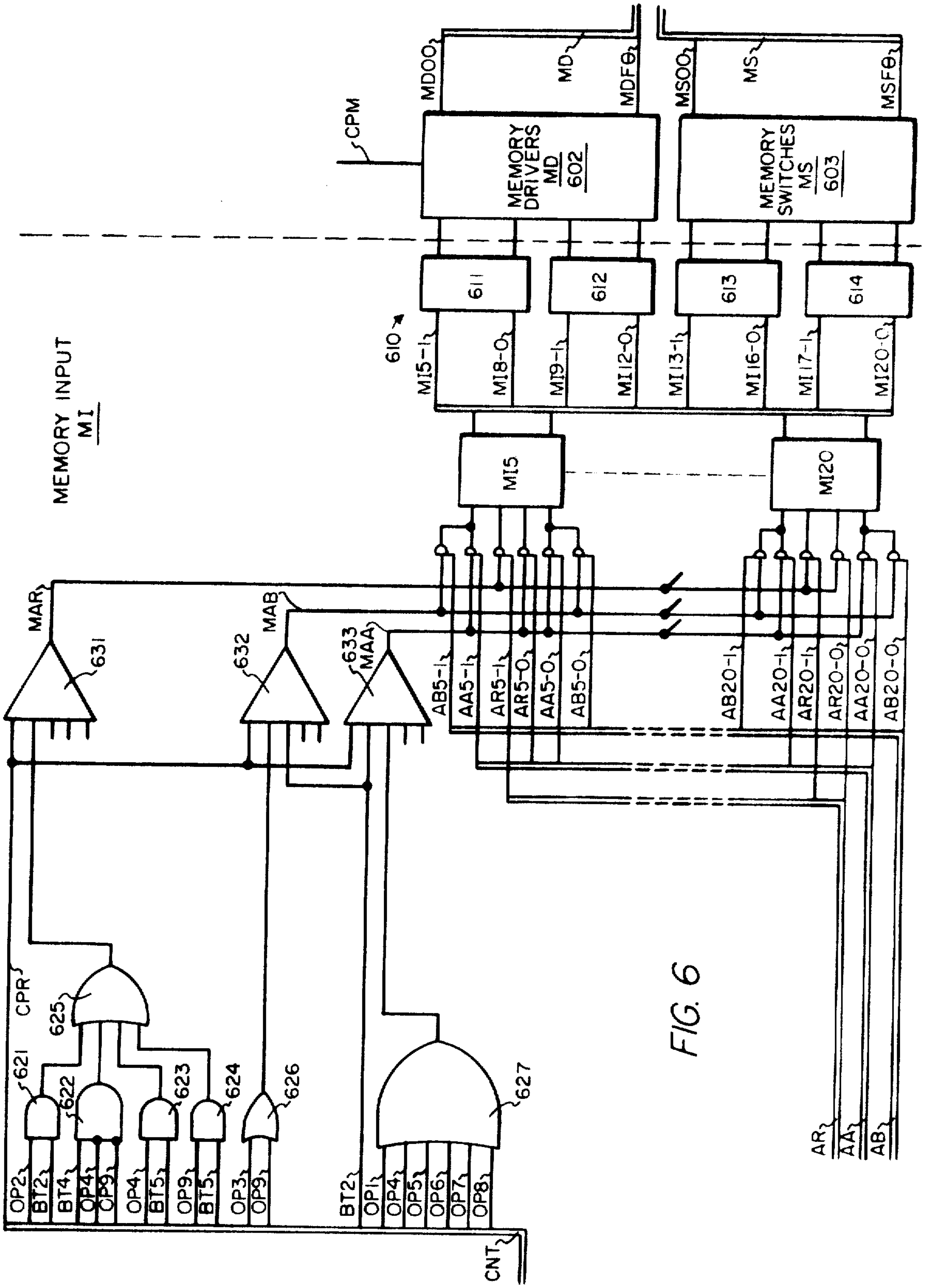
Figure 7:
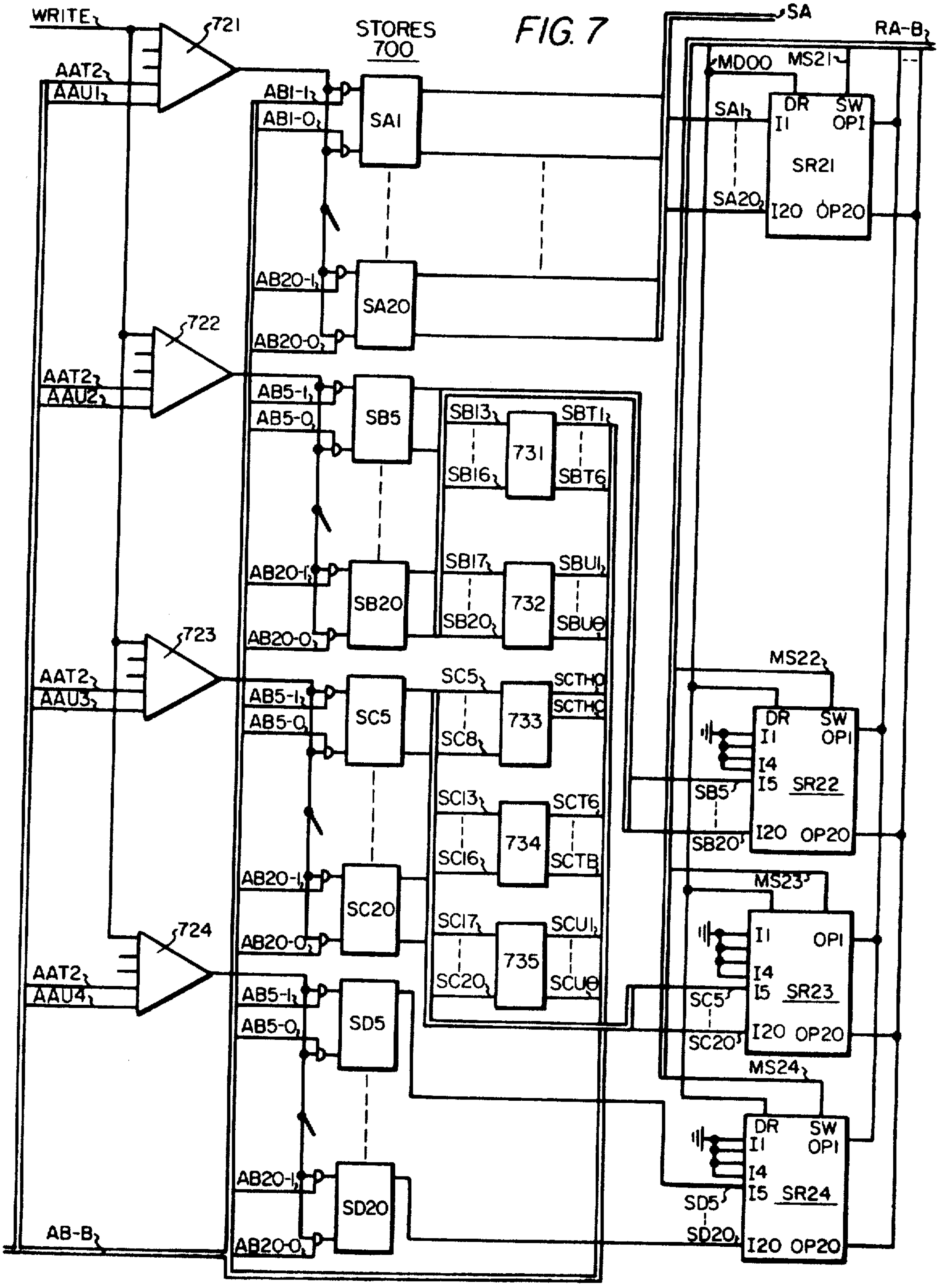

The arrangement shown in FIG. 1 represents a modification of the Small Exchange Stored Program Switching System disclosed in said Duthie et al patent. In that patent the central processing unit is shown in FIGS. 6 and 7. The clock 301, bit time counter BTC and instruction register 303 with decoder 304 shown herein correspond to the clock 601, bit time counter 602, instruction register flip-flops IR1-4 and OP code decoder 605 shown in the patent. The address register AR corresponds to the current address counter comprising flip-flops CAC5-20 in the patent. The accumulator AA herein replaces the memory output register flip-flops MOR1-20 and the address portion IR5-20 of the instruction register of the patent. The accumulator AB herein corresponds generally to the accumulator flip-flops ACC1-20 and associated arithmetic circuits in FIG. 7 of the patent. The memory input register MI and decoding circuits 610 correspond generally to the circuits shown in FIG. 2 of the patent. The modifications of the memory output circuits as used in the system of FIG. 1 herein are disclosed in detail in the said memory arrangement patent application by Thomas. There are detailed modifications of all of the circuits of FIG. 1 with respect to those disclosed in the Duthie et al patent.

The basic logic circuits used herein are generally the same as those disclosed in the Duthie et al patent. The logic levels are a negative 8 volts for "1," and ground potential for "0." An open circuit is also used for the logic level "1," the output of a logic module generally being from the unbiased collector electrode of a transistor which is in the cutoff condition for the "1" state, and the negative biasing potential being supplied at the inputs of the succeeding logic modules. The clock pulses as now used in the system comprise trains of negative pulses, which are a train of pulses of the lead CPM (FIG. 3) of 3 microseconds duration recurring every 10 microseconds and a train of pulses on lead CPR of 0.7 microseconds, with the leading edge of the CPR pulses occurring in coincidence with the trailing edges of the C M pulses. The actual logic circuits as used in the system are principally NOR gates, but are disclosed herein as AND and OR gates to improve the clarity. As stated in column 5 of the Duthie et al. patent, some of the building block circuits are disclosed in Prescher et al. U.S. Pat. No. 3,173,994, FIG. 21. The symbols for the AND and OR gates as used herein have been changed to conform to current practice. Referring for example to FIG. 4, block 413 represents an AND gate and block 415 represents an OR gate, with a circle at an input or output as shown for example at gate 414 representing an inversion or inhibit function. The gated pulse amplifier circuits such as 411 are generally similar to circuit 201 shown in FIG. 5 of the Duthie et al. patent, except for the number of DC control inputs. The upper input of the circuit is an AC clock pulse input and the lower four inputs are DC control inputs connected as an AND function. Therefore when all four of the inputs are at the logic level "1" or open circuited a clock pulse at the upper input is gated and amplified to the output. The various decoding circuits generally comprise AND gates such as that shown in block 511 of the Duthie et al patent. The flip-flops such as AR5 have a number of set inputs shown on the left side of the upper half and a number of reset inputs shown on the lift side on the lower half. Each input is from a coincidence gate represented by a small semi-circle on which the input at the center left is an AC clock input and the input from the top or bottom of the left side is a DC control input, with the DC input required to be present for a center time before the occurrence of the clock pulse input to be effective to change the state of the flip-flop.

There are several gates and gated pulse amplifiers actually used in the system, not shown herein, which are used for amplification and distribution of the signals. For example the busses include several such gating circuits to different groups of units, and also separately to odd and even numbered units for reliability. Thus connections disclosed and claimed herein, while shown as simple conductors, may in actual practice include circuits which repeat the signals.

A memory word comprises 20 bits organized as five digits of 4 bits each. For instruction words, the first digit is the operation code and the other four digits are an operand address.

The operation codes (OP codes) with their assembler mnemonics are as follows:

LOAD (OP 1) — read the contents of the operand memory address location and place the result in the accumulator AB.

STORE (OP 2) — write the contents of the accumulator AB into the operand memory address location.

TRANS (OP 3) — transfer the contents of the address location stored in the accumulator AB into the accumulator AB. (The operand part of the instruction is blank).

COMP (OP 4) — compare the contents of the accumulator AB with the contents of the operand address location as read into accumulator AA. If equal, proceed to the next instruction in sequence by incrementing the address register by 1 as normal. If unequal, skip one address in the program.

ADD (OP 5) — add 1, 10 or 100 (literals stored at operand address location) to the contents of the accumulator AB.

BR (OP 6) — branch to the instruction at the operand address location.

MASK (OP 7) — mask the contents of the accumulator AB with the contents from the operand address location as read into accumulator AA. Keep the digit where one's are present and set to zero where zero's are present (logical AND).

SUPER (OP 8) — superimpose on the accumulator AB the contents of the operand memory address as read into accumulator AA (logical OR).

SCAN (OP 9) — make an associative search beginning with the address in the accumulator AB. (The operand part of the instruction is blank). When the contents of the accumulator AA compare with the contents of the storage register SA, the search is completed and the next address is used. When the contents of accumulator AB and a wired constant C compare, skip one address in the program. Note that the necessary data must be placed in the register SA and the accumulator AB before this OP code is called upon.

Figure 2:
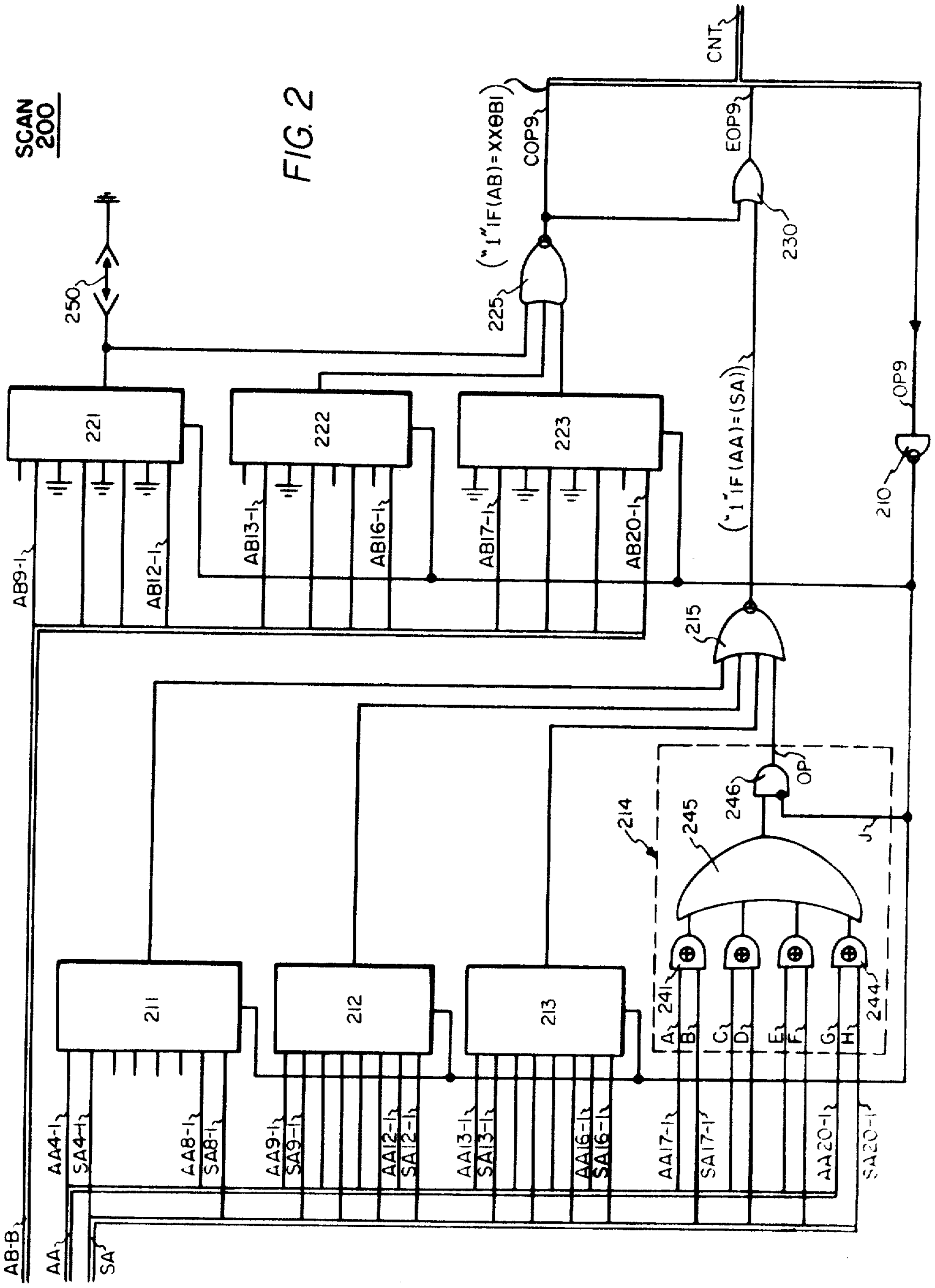
FIG. 2 is a functional block diagram of the comparators used for the operation code SCAN.

The comparison circuits for the SCAN operation are shown in FIG. 2. The basic comparison modules 211–214 and 221–223 each provide for comparing one set of four inputs to a corresponding set of four inputs. These modules may be of the type disclosed in U.S. Pat. No. 3,478,314 by W. R. Wedmore for a Transistorized Exclusive-OR Comparator. Block 214 is a symbolic functional equivalent of the module. It includes four exclusive OR gates 241–244, followed by an OR gate 245 and an output inhibit AND gate 246 to the output conductor OP. Each of the exclusive OR gates comprises a transistor with the two inputs connected via resistance and diode bias circuits to the base and emitter electrodes, the collector electrodes of the four transistors are connected together at a common point, and thence through a resistance-capacitance network to the base electrode of an output transistor, and the collector electrode of this last transistor is connected to the output lead OP. Another input from a terminal J is connected through a resistance network to the base electrode of the output transistor to act as an inhibit input. The Boolean equation for the Wedmore circuit or for the generally equivalent logic of block 214 is:

$$OP = \bar{J}\,(A\bar{B} + \bar{A}B + C\bar{D} + \bar{C}D + E\bar{F} + \bar{E}F + G\bar{H} + \bar{G}H)$$

The outputs of the four comparator modules 211–214 are connected to respective inputs of a NOR gate 215. The J inputs of the four modules are connected in common to the same source. The result is that if the logic level at input J is "0" and the signals on two sets of inputs compare so that each signal in one set is equal to its respective signal in the other set then the output of the NOR gate 215 is a "1." The specific inputs in this case are the set of conductors AA (from accumulator AA) and the set of conductors SA (from the store register SA). For the particular system requirements the first comparator module 211 has its upper pair of inputs connected to the leads from the fourth bit position of each of the conductor sets AA and SA and its lower pair of inputs to the eight bit positions; while the inputs for the other three comparator modules run from the ninth bit position of each set at the upper inputs of module 212 to the leads from the 20th bit position of each set at the lower inputs of a module 214; corresponding to the last three digit positions of the data stored in the accumulator AA and the storage register SA.

The three comparator modules 221–223 along with NOR gate 225 are used in a similar manner to compare the contents of the last three digit positions of the accumulator AB with a wired constant. The specific constant shown has the value θB1 corresponding to the binary number 1010 1011 0001, with the 1's and 0's provided by open circuit and ground potentials respectively. Thus if a five digit number is stored in the accumulator AB, the first two digits may be any value as far as operation of comparator is concerned which may be indicated by an X; so that the output of NOR gate 225 has the value of "1" if the contents of the accumulator AB has the value XXθB1. This signal appears on the lead COP9 in FIG. 2.

To appreciate the significance of the particular constant, please note that the sixteen possible values for the four-bit binary coded digit are as explained in column 7 of the Duthie et al patent are 0 for the null value 0000, followed by the values 1–9, then θ for the value 1010 followed by the values B-F in which the bits have the weight 8-4-2-1. The symbol θ is used to correspond to the 0 of telephone directory numbers because it is usually transmitted as 10 pulses in dialing. Thus each digit position of a directory number may have any one of the 10 values 1-θ, and for a block of a thousand numbers they may have the value X111-Xθθθ. Thus if a block of one thousand numbers is being scanned the last number would have the value Xθθθ. The operation of the counting circuits is such that the last three digits for the next count would have the value θB1; so that this constant indicates that all thousand numbers have been scanned and the counter has advanced to the next step.

An option is provided in the comparison circuits to connect the output of the comparator module 221 via a strap 250 to a ground terminal, which has the effect of eliminating the corresponding digit from the comparison so that only the last two digits are compared and the constant becomes equal to XXXB1, which permits 100 numbers to be scanned at a time.

The J inputs of both sets of comparator circuits 211–214 and 221–223 are connected via the output of an inverter 210 from the conductor OP9 from the instruction register decoder. The outputs from the two NOR gates 215 and 225 are connected to respective inputs of an OR gate 230, the output of which is connected to a conductor EOP9. Thus when the signal OP9 is "1"; and when the contents of accumulator AB has its last three digits (or two digits if the wired option is used) are equal to the constant the signals on leads COP9 and EOP9 both become "1"; and when the contents of accumulator AA compare to the contents of the store register SA the output of NOR gate 215 is "1" which causes the signal on lead EOP9 to also be "1."

In an alternative embodiment not shown the inputs for the constant at the comparator modules 221–223 may be connected to the outputs of another temporary memory register, so that any desired constant may be stored therein under programmed control for use in making the comparison.

Figure 3:
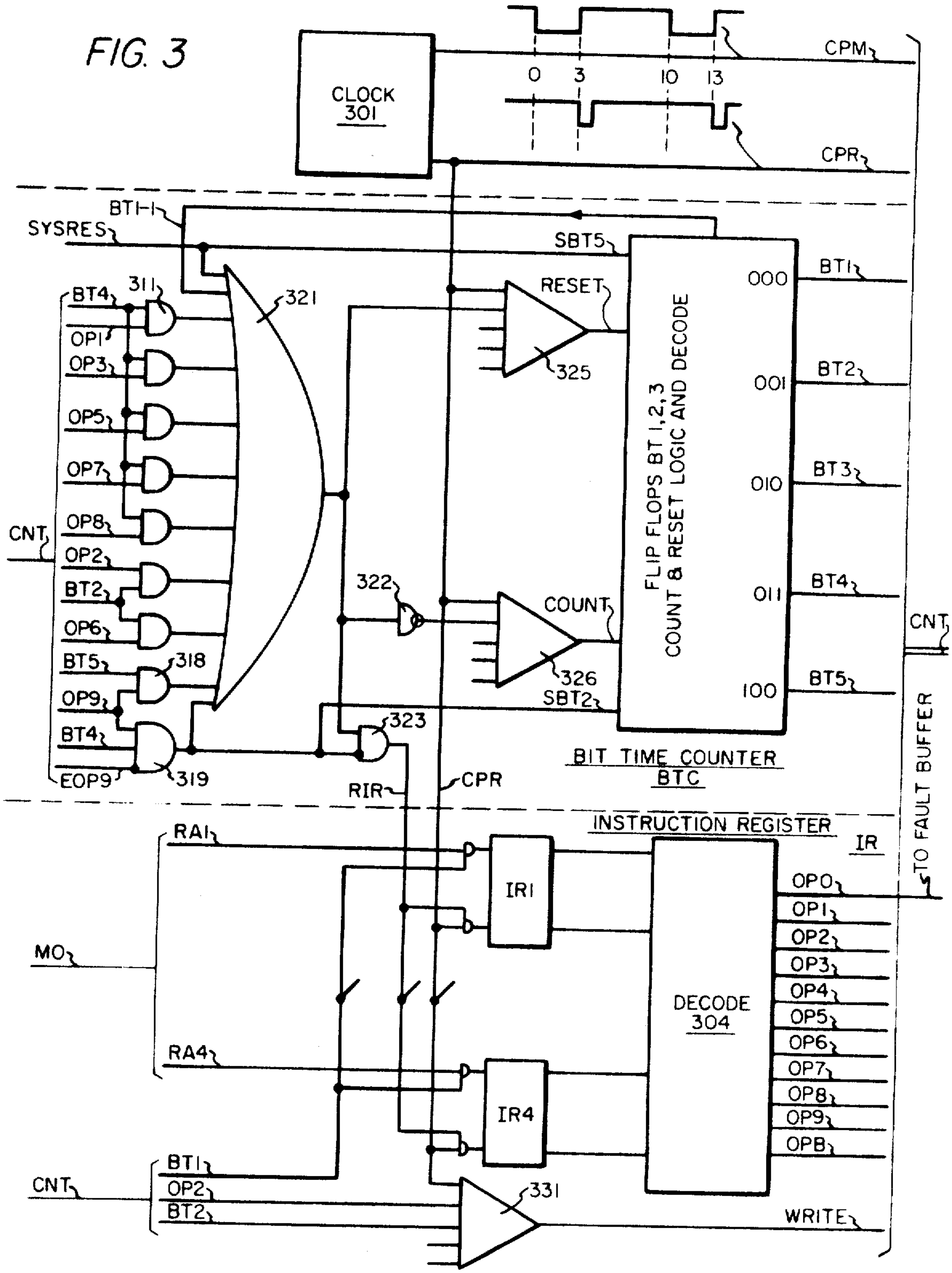
FIGS. 3–7 are functional block diagrams of the registers and logic circuits of other portions of the central processing unit, of the memory input, and of general storage registers.
Figure 4:
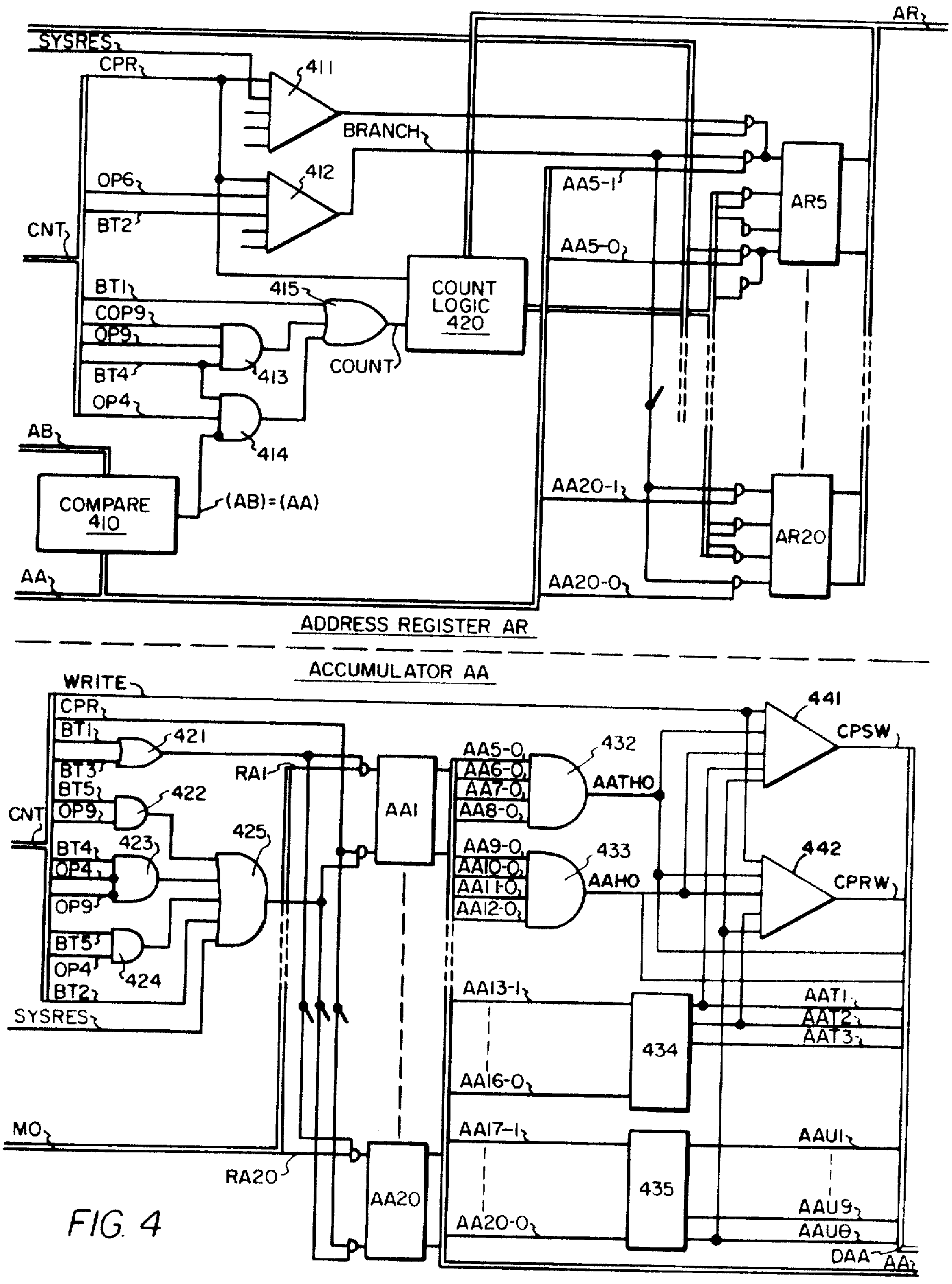

In FIG. 3 the clock is shown as block 301 which supplies the recurring pulse trains as indicated by the graphs on lead CPM and CPR. The pulses on lead CPM are used principally to enable the memory driver circuits, and the pulses on lead CPR are used as AC inputs to the gated pulse amplifiers and the coindidence gates of the flip-flops to control the timing of the change of state.

The bit time counter BTC counts from one to five. Every operation (OP) code begins with bit time BT1 and the counter advances by one on every CPR clock pulse. However some operations can be conducted in fewer bit times than others. The counter comprises three flip-flops BT1, BT2, and BT3, which along with the counting and reset logic and decoding circuits is represented by block 310. The states of the flip-flops for each output state are shown along the right side of this block, the state 000 being decoded as output BT1, etc. up to the state 100 being decoded as output BT5.

The counter advances by one or resets on each pulse from lead CPR as controlled by the gated pulse amplifiers 325 and 326. Normally the output of OR gate 321 is at the level "0" so that the gated pulse amplifier 325 is inhibited and gated pulse amplifier 326 is enabled via inverter 322, so that the counter advances on each occurrence of a pulse on lead CPR. Reset is controlled by gates 311–319 connected to the inputs of OR gate 321. State BT4 causes resetting for codes OP1, OP3, OP5, OP7 and OP8; state BT2 causes resetting for codes OP2 and OP6, and for code OP9 the resetting may occur either with state BT4 or BT5. Also any time the flip-flop BT1 is in the set state, which will only occur for state BT5, the signal on lead BT1-1 will cause reset. The system reset signal on lead SYSRES also enables the reset and via the signal on lead SBT5 in conjunction with the signal on lead RESET forces the counter to state BT5. A signal on lead SBT2 in conjunction with the signal on lead RESET will force the counter to state BT2.

Code OP9 is the only operation code which will cause the bit time counter to reset to a state other than BT1. If comparison is not found, that is the contents of accumulator register AA are not the same as the contents of the storage register SA, and the address in the accumulator AB is not equal to the constant, then the signal on lead EOP9 is at "0"; so that during the state BT4 gate 319 has at its output the signal condition "1." This causes the signals on leads SBT2 and RESET to be "1" so that the counter is set to state BT2. When either comparison indicates equality, then the signal on lead EOP9 is at signal level "1" so that gate 319 is inhibited and the counter advances to state BT5. Then on the next clock pulse the output from gate 318 will produce the reset condition to change the state to BT1. Thus it may be seen that when the central processor is in the state with code OP9, which is the SCAN mode, the bit time counter recycles skipping state BT1 and goes directly from state BT4 to BT2. Since state BT1 is the state for reading instructions from the memory, no instruction is read and the processor remains in the same state OP9.

The instruction register IR comprises four flip-flops IR1-4. This register receives information in parallel from the memory output read amplifiers via leads RA1-4 during interval BT1, the signal on lead BT1 supplying the DC input to the set coincidence gates, and the signals on leads RA1-4 supplying the AC inputs to load the flip-flops. The information stored in these flip-flops is the operation (OP) code, which is decoded by the logic 304. The output on lead OP0 is an invalid code which indicates that an instruction was not read, probably due to an open diode or other fault in the memory; so this output is used by the fault buffer. The outputs OP1-OP9 correspond to the operation code previously described. Since the digit comprises four bits the output could be expanded to a maximum of fifteen outputs other than the zero output. One such additional output OPB is shown.

A reset control from gate 323 associated with the bit time counter BTC provides a means of setting the instruction register back to zero after the execution of each instruction by supplying a DC input to the reset coincidence gates, with the lead CPR connected to the AC inputs to clock the reset. Note that the reset command is supplied whenever a signal is received from the OR gate 321 for resetting the bit time counter flip-flops; except that it is inhibited by the output of gate 319 during the SCAN operation for code OP9. This permits the instruction register to remain set at the state OP9 while the bit time counter cycles skipping the interval BT1.

A gated pulse amplifier 331 enabled by DC signals on leads OP2 and BT2 gates a clock pulse from lead CPR to generate a signal on lead WRITE, which is used to write the information into the temporary memory flip-flops during the STORE operation.

The outputs of the clock 301, the bit time counter BTC and the instruction register IR are shown combined as a set of conductors CNT, at least some of these signals being used by most of the other blocks of a central processing unit and also the memory input register.

The address register AR in FIG. 4 stores the address to be executed next. It comprises flip-flops AR5-20 and associated logic circuits. The count logic circuits 420 cause the address to be incremented by one during the occurrence of a pulse on lead CPR when the signal on lead COUNT is "1," which occurs via OR gate 415 every cycle during the first bit time interval by the signal on lead BT1, and also conditionally during interval BT4 for the execution of codes OP4 and OP9.

The compare logic for code OP4 shown as block 410 (which is not part of the address register but is shown here for convenience) compares the contents of the accumulator registers AA and AB, and supplies an output signal which inhibits gate 414 when the comparison indicates that the contents are equal. Thus if a comparison is true the register advances only once during the cycle on the occurrence of a signal on lead BT4 as normal and the next instruction in sequence is executed next; while if the comparison indicates an inequality of the two sets of data, gate 414 is not inhibited so that during the occurrence of signal on lead BT4 the register is advanced an additional step causing one instruction to be skipped.

During the SCAN operation (OP9) the address register is incremented once during the first cycle when the instruction is read during the interval BT1 as normal, and during subsequent cycles the interval BT1 is skipped by the bit time counter so that the address register does not advance further. The end of the operation occurs when a comparison is found in FIG. 2 either via gate 215 or 225, which can never occur at the same time. A "1" output from gate 215 indicates that the associative search has been completed by finding the word having the data corresponding to that in the register SA; in which case no further signal is supplied to the address register and the instruction already there is used next. However, if the address stored in accumulator AB which corresponds to the wired constant is reached, then the signal on lead COP9 at gate 413 during the occurrence of interval BT4 causes the address register to be incremented one additional step, so that an instruction is skipped. This causes entering a segment of a program to store data indicating that the search should be continued at a later time in the program, or that the search is to be terminated upon not finding a matching condition.

The branch instruction command OP6 along with the signal on lead BT2 is used to enable gated pulse amplifier 412 to pass a pulse from lead CPR to supply AC signals to set and reset inputs of the flip-flops to load data from the accumulator AA.

In addition the reset signal on lead SYSRES enables gated pulse amplifier 411 to supply reset signals to set the register to designated start addresses for the main or standby programs.

The accumulator AA comprises 20 flip-flops AA1-20. This register receives the information in parallel from the memory output read amplifiers via the twenty leads RA1-20 to the AC set inputs; the DC inputs being enabled during bit time intervals BT1 and BT3 via OR gate 421. The register is reset by a pulse on lead CPR when the reset DC inputs are enabled by a signal from OR gate 425; which occurs during interval BT2 of every cycle, during interval BT5 for the codes OP9 and OP4 via gates 422 and 424 respectively, during interval BT4 for all other operation codes via gate 423, and also when the system reset signal is present on lead SYSRES.

The output of accumulator register AA is also used for the STORE operation code OP2 during the interval BT2 as the operand address indicating into which register the information from accumulator AB is to be written. The output for the digit AA5-8 is decoded by gate 432 as the thousands digit on lead AATH0, and for the digit AA9-12 by gate 433 as the hundreds digit on lead AAH0, since these two digits for the temporary addresses are always 00. The digit AA13-16 is decoded by logic 434 to provide the tens digits AAT1, AAT2, or AAT3; and the digit AA17-20 is decoded by logic 435 to provide a units digit signal on one of the leads AAU1-AAU$\theta$.

Figure 5:
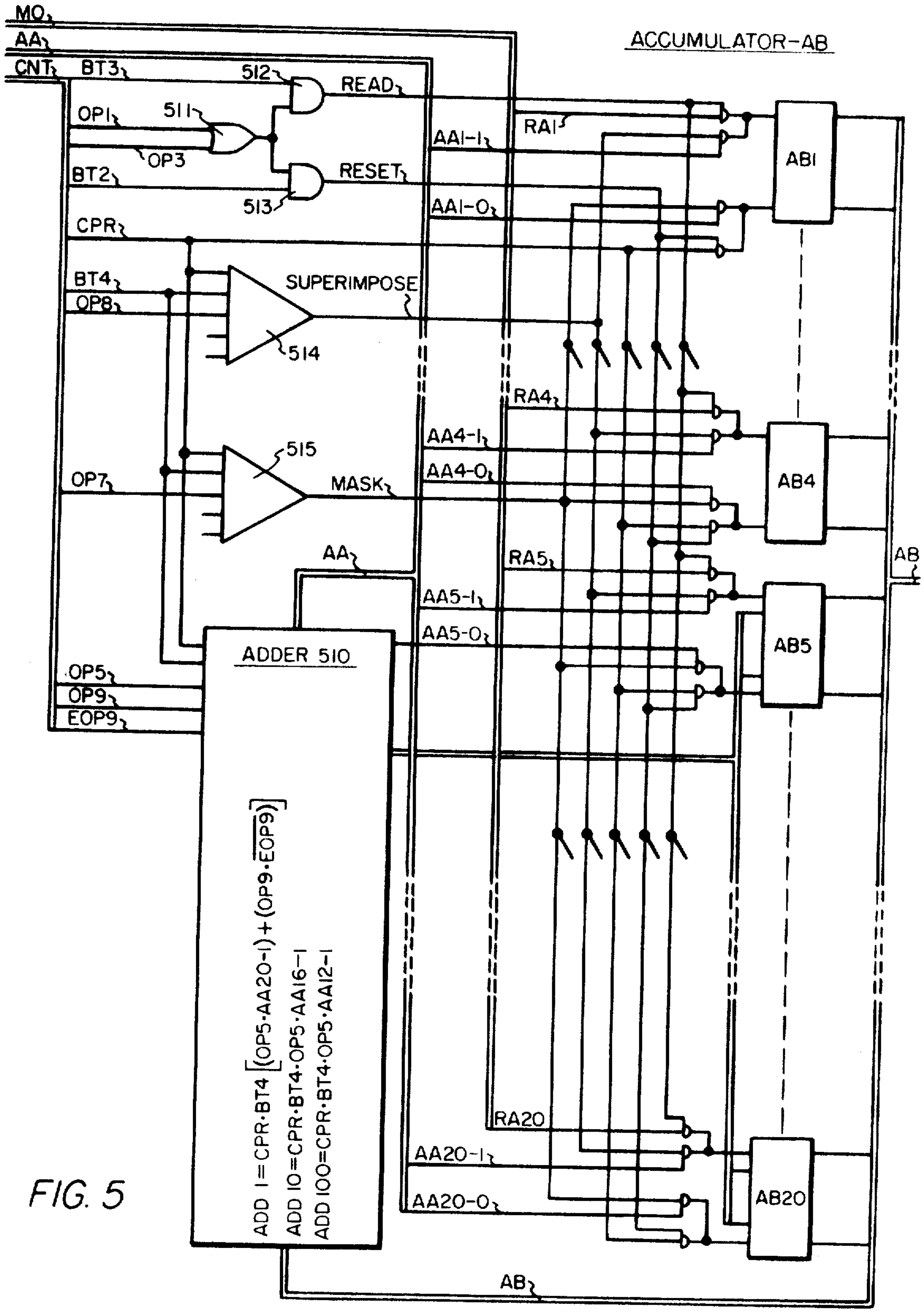

The accumulator AB shown in FIG. 5 comprises twenty flip-flops AB1-20. This register stores the output result for most of the operations, and also supplies part of the input data for many of them.

For the load and transfer operations, accumulator AB receives information directly from the memory output read amplifiers via the conductors RA1-20 to the AC inputs of one set of coincidence gates. For these operations the code OP1 or OP3 via OR gate 511 enables gates 512 and 513 so that during the bit time interval BT2 gate 513 supplies DC reset commands to a set of coincidence gates to reset all of the flip-flops on the occurrence of a pulse on lead CPR, and then during the interval BT3 gate 512 supplies a read command to the DC inputs of the set coincidence gates to load the information from the memory output.

Adder logic 510 provides the addition logic indicated by the Boolean equations within the box. This logic includes set and reset coincidence gates for the flip-flops AB5-20 having AC inputs from lead CPR, and logic for the DC inputs thereof which is actuated during bit time BT4 to add 1, 10 or 100 to the contents of the flip-flops AB5-20. For the add operation OP5, the data 1, 10 or 100 is stored in accumulator AA as a bit in the corresponding one of the flip-flops AA20, AA16 or AA12 respectively. For the SCAN operation OP9, the address in flip-flops AB5-20 is incremented by one during bit time BT4 as long as the signal on lead EOP9 has a value "0."

The mask and superimpose operations OP7 and OP8 control the gated pulse amplifier 515, 514 respectively during the interval BT4 to supply a clock pulse from lead CPR to the AC inputs of coincidence gates to cause information from accumulator AA at the DC inputs of the coincidence gates to be masked via reset inputs, or superimposed via set inputs respectively.

The memory input register MI comprises flip-flops MI5-20, as shown in FIG. 6. The instruction for the next cycle is transferred from the address register AR via the leads AR5-1 to AR20-0 inclusive connected to the DC inputs of respective coincidence gates; which are clocked via signals from gated pulse amplifier 631 when enabled by a DC signal from OR gate 625, which occurs during bit time BT2 for code OP2 via gate 621, during bit time BT5 during codes OP4 or OP5 via gates 623 or 624 respectively, and for other codes during bit time BT4 via gate 622.

The data address from accumulator AB is transferred via DC inputs of set and reset coincidence gates which receive AC input pulses from gated pulse amplifier 632 when enabled during bit time BT2 and the operation codes OP3 or OP9 via OR gate 626.

The data address from accumulator register AA is transferred via DC inputs of set and reset coincidence gates which are clocked via a signal from gated pulse amplifier 633 when enabled during bit time BT2 and any of the operation codes OP1, OP4, OP5, OP6, OP7 or OP8 via OR gate 627. The output of the memory input register is decoded via the circuits 610 comprising logic circuits 611 for the first address digit from flip-flops MI5-8, decoding logic 612 for the second address digit from flip-flops MI9-12, via decoding logic 613 for the third digit from flip-flops MI13-16, and decoding logic 614 for the fourth digit from flip-flops MI17-20. The first two digits are used by the memory drivers 602 which require an enabling clock pulse on lead CPM. The last two digits are used by the memory switches 603.

As shown in FIG. 7, a storage register SA comprising flip-flops SA1-20 has an address 0021, a storage register SB comprising flip-flops SB5-20 has an address 0022, a storage register SC comprising flip-flops SC5-20 has an address 0023, and a storage register SD comprising flip-flops SD5-20 has an address 0024. Data may be stored in these registers from the accumulator AB via connections to the DC inputs of set and reset coincidence gates as shown. During the store operation in interval BT2 the signal on lead WRITE from gated pulse amplifier 231 (FIG. 3) supplies a clock pulse to the four gated pulse amplifiers 721–724. If one of these gated pulse amplifiers has its address stored in accumulator AA the signals from the set of conductors DAA via bus AB-B enables its DC inputs so that the clock pulse is gated to the AC inputs of the coincidence gates of the corresponding storage register to cause a transfer of the data from accumulator AB. To load information from one of these storage registers into the accumulator AB during the load operation one of the storage readout circuits SR21–SR24 is used. These storage readout circuits are disclosed in said Memory Arrangement patent application by R. M. Thomas. Each of them has an input shown via bus RA-B from the memory driver MD00, and from the memory switches on one of the leads MS21–MS24 corresponding to the last two digits of its address. When both the memory driver and the memory switch of one of the storage readout circuits is enabled the data from the corresponding storage register is supplied via the set of conductors comprising bus RA-B to the read amplifiers 102 (FIG. 1) and then via the memory output bus MO to accumulator AB.

The output from the flip-flops SA1-20 is also supplied via the set of conductors SA to the scan unit 200 for use in the SCAN operation OP9.

Figure 15:
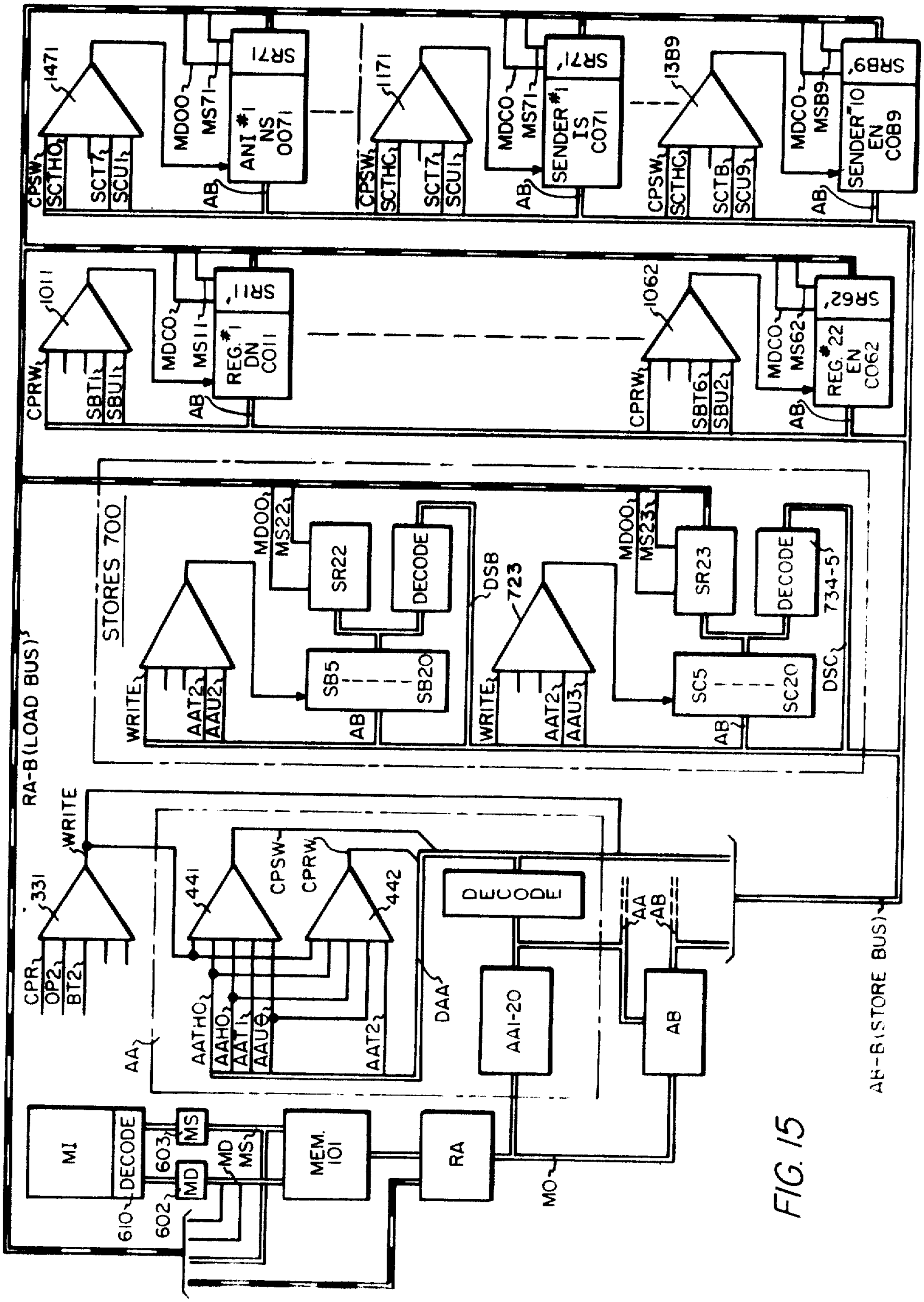
FIG. 15 is a functional block diagram of some of the apparatus shown in the other figures to illustrate the indirect addressing principle.

Indirect Addressing of Registers, Senders and Automatic Number Identification Units Indirect addressing with permanently wired addresses is used for the registers, senders and automatic number identification units shown as block 130 in FIG. 1. The indirect addressing apparatus comprises gated pulse amplifiers 441 and 442 shown in FIG. 4, and the store registers SB and SC along with decoding circuits 731–735 shown in FIG. 7. These circuits are also shown in FIG. 15 along with several of the store registers which may be indirectly addressed. Indirect addressing is used only for the write-control operation using the STORE code OP2; direct addressing of the same store registers being used for the read-control operations using the LOAD code OP1 or the TRANS code OP3. The operand addresses 001θ and 002θ are used for indirect addressing, which enable the gated pulse amplifiers 441 and 442 respectively. Thus the output of decoding gate 432 supplies the signal AATHO supplying the thousands digit, decoding gate 433 supplies the signal AAHo which is the hundreds digit, the decoding circuits 434 supply the tens digits AAT1 and AAT2, and the decoding circuits 435 supply the units digit AAUθ for the D.C. inputs of these gated pulse amplifiers. During a STORE operation the gated pulse amplifier 331 (FIG. 3) is enabled by the signals on leads OP2 and BT2 to gate the clock pulse on lead CPR to the lead WRITE, connected to the clock pulse inputs of the gated pulse amplifiers 441 and 442, which have the respective output leads CPSW and CPRW. Thus when one of these gated pulse amplifiers is addressed during a STORE operation a clock pulse appears on its output.

The address of a store being indirectly addressed is placed in either store register SB or store register SC. As shown in FIG. 7 the store register SB comprises flip-flops SB5-SB20, with the output of flip-flops SB13-SB16 being decoded by circuits 731 to supply the tens digits SBT1-SBT6, and the output of flip-flops SB17-20 is decoded by circuits 732 to apply the units digit on one of the 10 output leads SBU1-SBUθ. The store register SC comprises flip-flops SC5-SC20, with the thousands digit from the output of flip-flops SC5-8 decoded by circuit 733 to supply either the thousands digit SCTHO or SCTHC, the output of flip-flops SC13-16 is decoded by circuit 734 to supply the tens digit on one of the six output leads SCT6-SCTB, and the output of flip-flops SC17-20 is decoded by circuit 735 to supply the signal on one of the 10 output leads SCU1-SCUθ.

For purposes of the STORE operation, the stores of the registers, senders and automatic number identification units may be grouped into two sets, one set comprising a directory number store and an equipment number store for each of 22 dial registers; and the other set comprising a directory number store and a sender number store for each of eight automatic number identification units, and four stores for each of ten senders. FIG. 15 shows the directory number store DN of dial register No. 1 having address CO11 and the equipment number store EN of register No. 22 having address CO62, the directory number store NS of the automatic number identification unit No. 1 having address 0071, the instruction store IS of sender No. 1 having address CO71, and the equipment number store EN of sender No. 10 having address COB9. Each of these stores has its own individual gated pulse amplifier which may be designated as an "input control gate" for the store, with the gated pulse amplifiers 441 and 442 designated as "special control gates" for indirect addressing. Each of the gated pulse amplifiers 1011–1062 for the set of stores associated with the dial registers has its clock pulse input connected to lead CPRW and has individual inputs from the store register SB decoding circuits for the tens and units address digits. The thousands and hundreds digits for all of these stores are CO and therefore the decoding connections are not necessary, but could be decoded and connected to the gated pulse amplifiers if desired. In the second set each of the gated pulse amplifiers such as 1471, 1171 and 13B9 have their clock pulse inputs connected to lead CPSW, with decoding connections for the thousands, tens and units digits (the hundreds digit being always zero).

REGISTER-SENDER AND ANI APPARATUS

Figure 8:
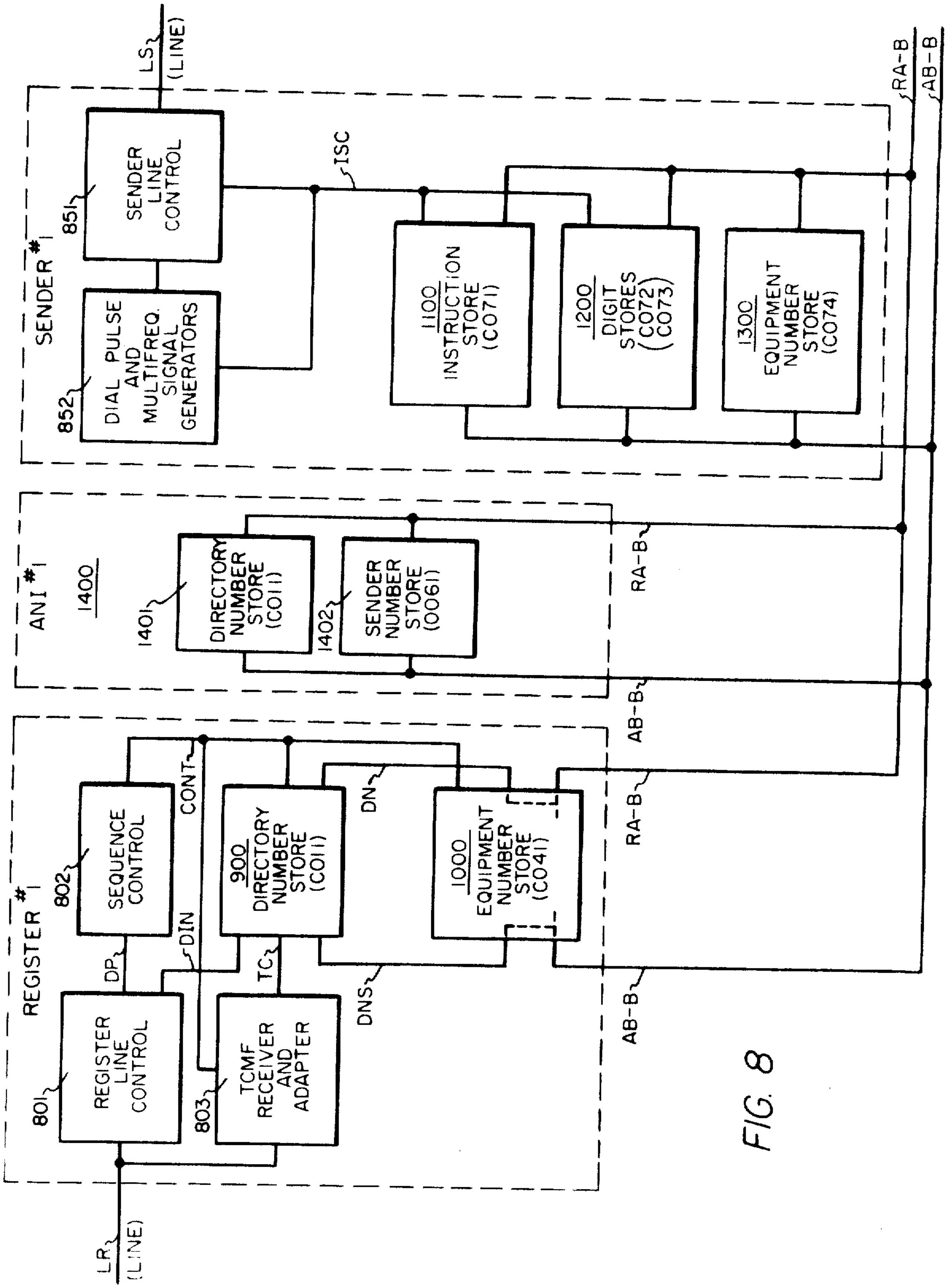
FIG. 8 is a single line block diagram of one register, one sender, and one automatic number identification unit.

FIG. 8 is a single line block diagram of one of the dialing registers, one of the senders and one of the automatic number identification (ANI) units. Each of the registers has a directory number store 900 and an equipment number store 1000 which for register No. 1 have the addresses CO11 and CO41 respectively; and also a register line control circuit 801, sequence control circuit 802 and a touch calling receiver and adapter 803.

Each of the senders includes an instruction store 1100, two digit stores 1200 and an equipment number store 1300 which for sender No. 1 have the addresses CO71, CO72, CO73 and CO74 respectively; and also a sender line control circuit 851 and circuits for dial pulse and multifrequency signal generators 852.

Each of the automatic number identification units 1400 has a directory number store 1401 and a sender number store 1402 which for ANI unit No. 1 have the addresses 0071 and 0061 respectively.

Each of the stores is coupled to the store bus AB-B to store data therein from the accumulator, and to the load bus RA-B to read data from the stores into the accumulator.

Figure 9:
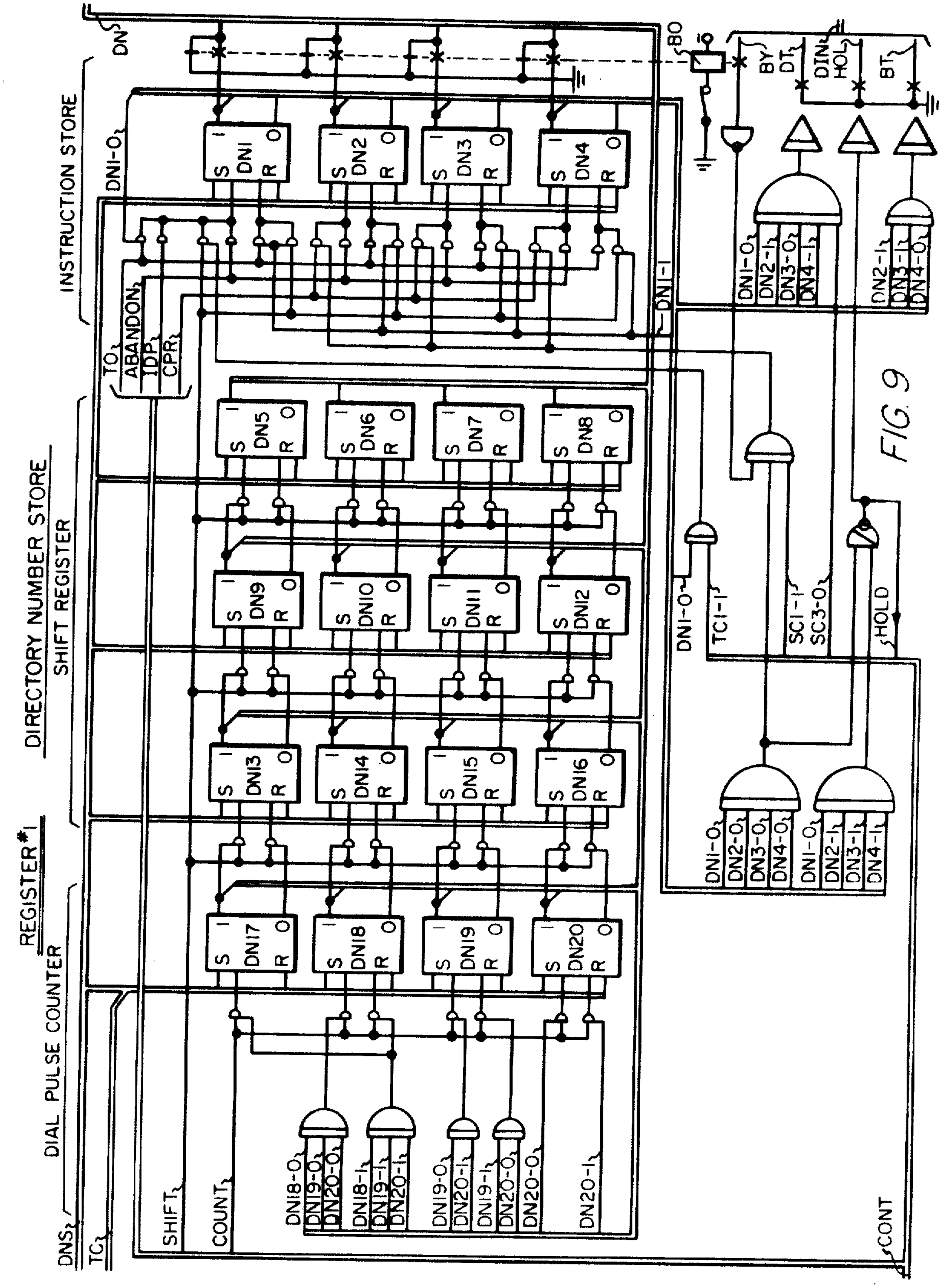
FIGS. 9 and 10 are functional block diagrams of the stores associated with a dialing register.

The directory number store for dialing register No. 1, shown in FIG. 9, comprises 20 flip-flops DN1-20. Flip-flops DN1-4 are used as an instruction store, flip-flops DN17-20 are used as a dial pulse counter, and flip-flops DN5-16 are used as a shift register for the dialed digits, digits being accumulated in the flip-flops DN17-20 and then during each interdigital pause each digit being shifted up one digit position. There are also various control logic circuits associated with the directory number store shown in FIG. 9. The input gates for the write-control STORE operation, and the storage readout circuit for the read-control operations are shown in FIG. 10, and connected by the sets of conductors DNS and DN respectively.

Figure 10:
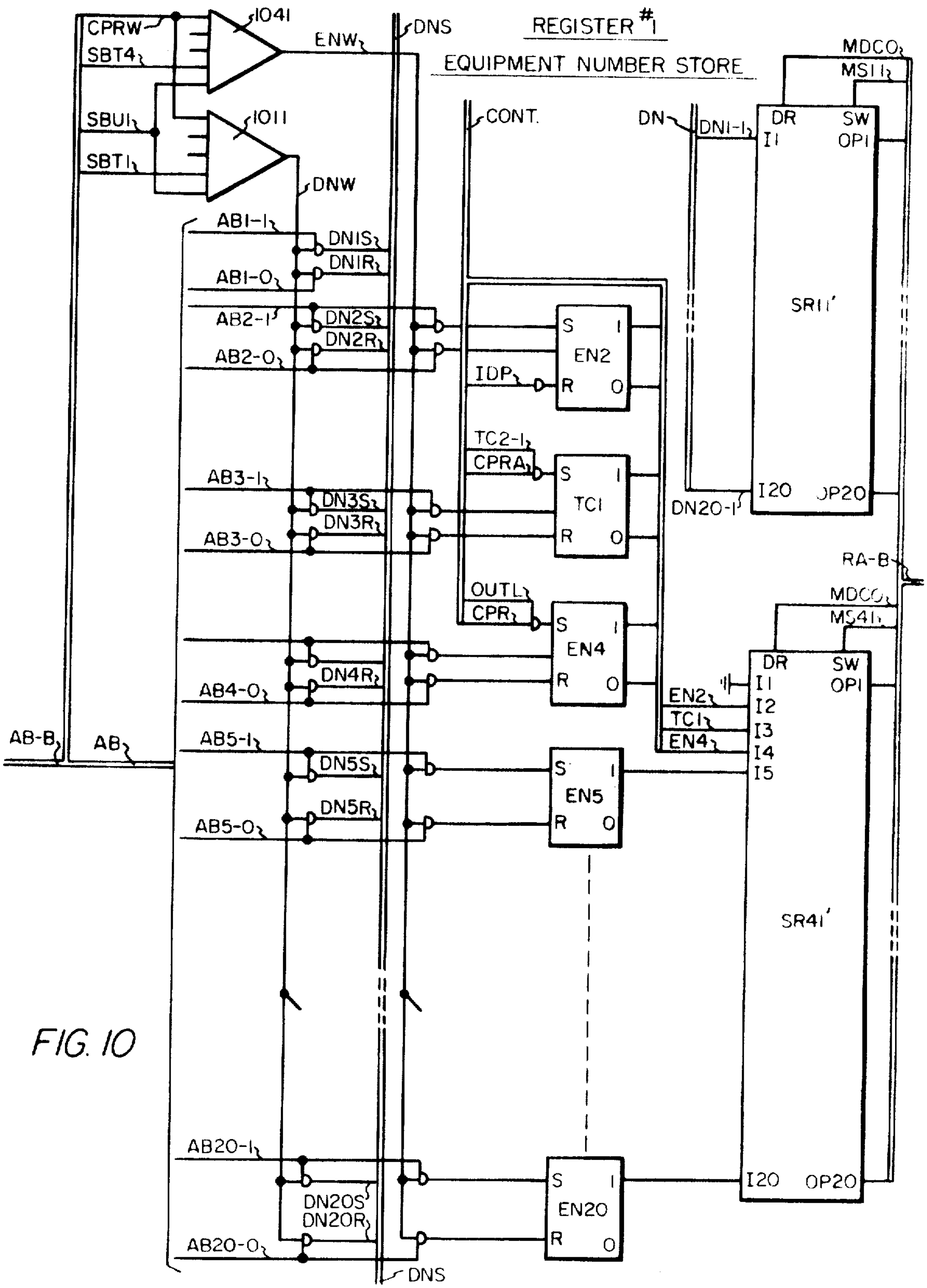

The equipment number stored for dialing register No. 1, shown in FIG. 10, comprises flip-flops EN2-20. The flip-flop in the place of EN3 is designated TC1 because of its function for touch calling service. The store bus AB-B has the address conductors connected to the gated pulse amplifiers 1011 and 1041 and the data conductors AB1-1 through AB20-0 connected for double rail input to the input coincidence gates for both the directory number and equipment number stores. When the gated pulse amplifier 1011 is addressed by the decoded signals from store SB, namely SBT1 and SBU1, then when a pulse appears on lead CPRW it is gated to the lead DNW to enable the input coincidence gates for the directory number store, the outputs being coupled to the set and reset inputs of flip-flops DN1-20 via the set of conductors DNS which comprises the set and reset conductors DN1S, DN1R for flip-flop DN1 through the set and reset conductors DN20S and DN20R for flip-flop DN20. Similarly when the gated pulse amplifier 1041 is addressed by the signals on leads SBT4 and SBU1 and a pulse appears on lead CPRW it is gated to lead ENW to enable the input coincidence gates for the equipment number store. The storeage readout circuits SR11' and SR41' are used to transfer information from the directory number and the equipment number stores respectively to a load bus when they are addressed by the appropriate memory driver and then memory switch signals.

Figure 11:
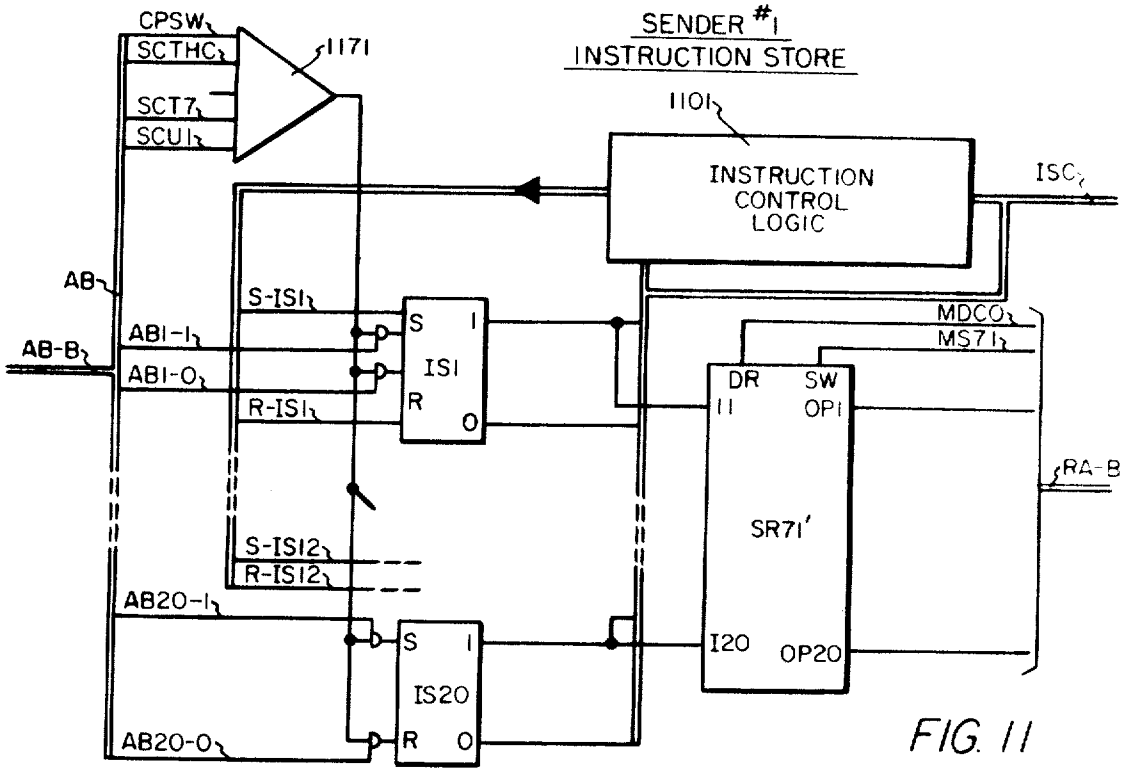
FIGS. 11, 12 and 13 are functional block diagrams of the stores associated with a sender.

The instruction store for sender No. 1, shown in FIG. 11, comprises flip-flops IS1-20. Certain of these flip-flops may be omitted depending upon the functions required. The gated pulse amplifier 1171 has direct current addressing signal inputs from the decoded outputs of storage register SC, and a clock pulse input on lead CPSW to control writing information into this store from the store bus AB-B. A storage readout circuit SR71' controls placing information from this store onto the load bus RA-B when appropriately addressed. There are additional logic control circuits designated instruction control logic 1101 associated with these circuits for certain sender control functions.

Figure 12:
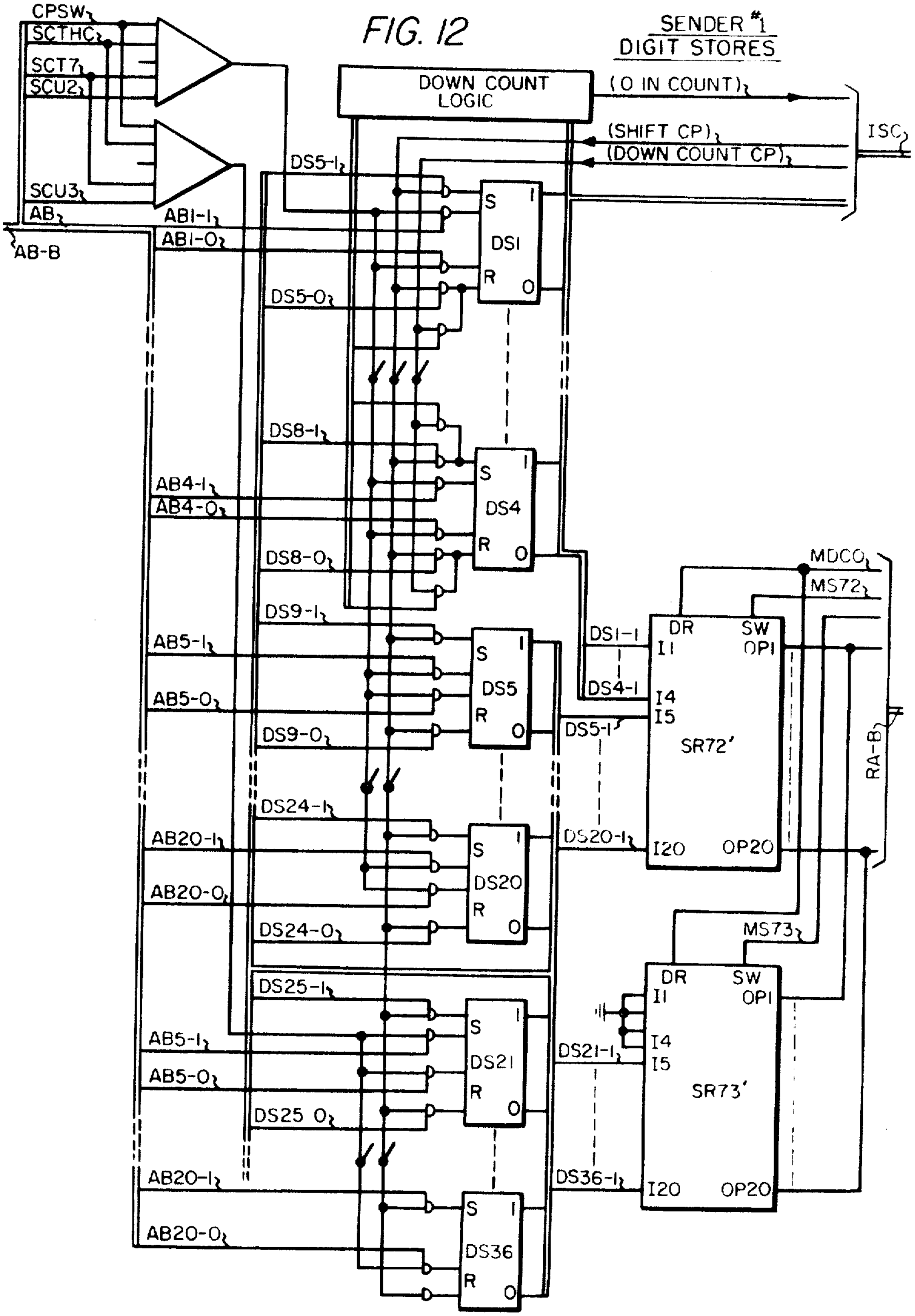

The sender No. 1 digits stores, shown in FIG. 12, comprise twenty flip-flops DS1-20 as a first store, and flip-flops DS-21–36 as a second store. Input of information from the store bus AB-B is controlled by the gated pulse amplifiers 1272 and 1273 respectively which have decoded address inputs from the store SC and a clock pulse input on lead CPSW. The output is via storage read-out circuits SR72' and SR73' to the load bus RA-B with address inputs from the memory drivers and switches. There is also a down count logic block 1201 associated with flip-flops DS1-4 used in dial pulse sending. These two stores are also connected as a shift register to shift digits a full digit position (four flip-flops) after each digit has been sent in response to a signal on the lead designated (shift CP).

Figure 13:
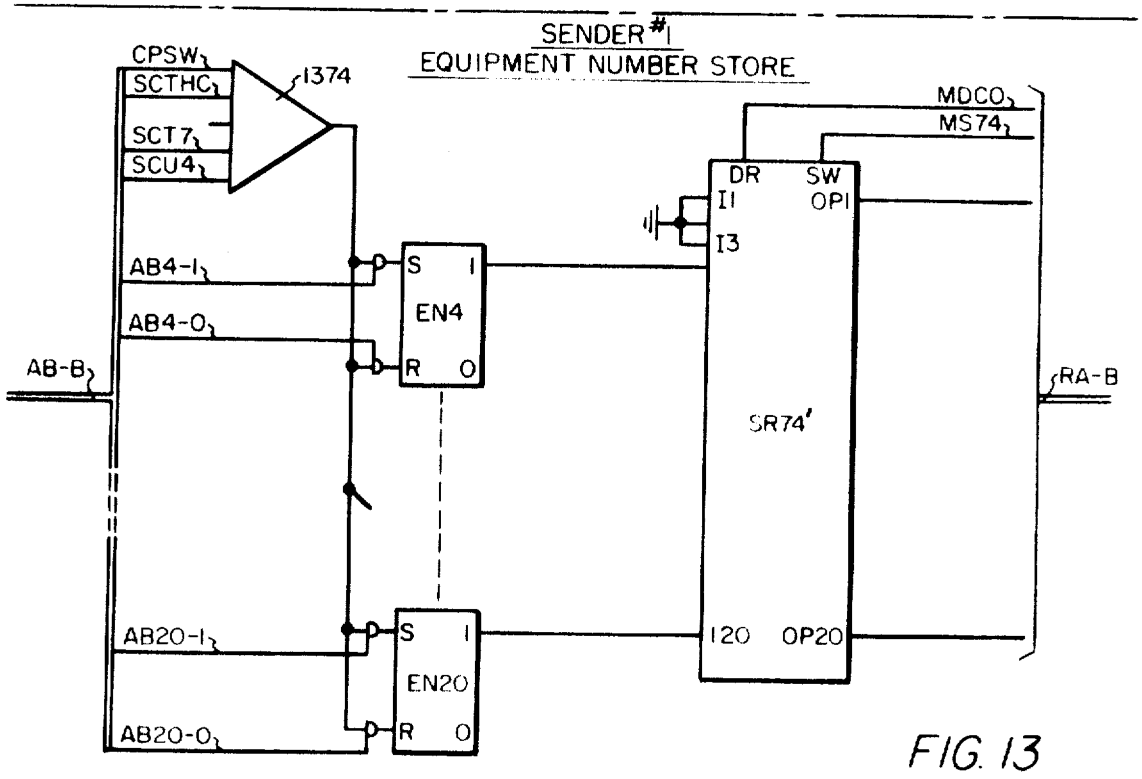

The equipment numbers store for sender No. 1, shown in FIG. 13, comprises flip-flops EN4-20. The input from the store bus AB-B is controlled by gated pulse amplifier 1374 having decoded inputs from store register SC and a clock pulse on lead CPSW. The output is via storage readout circuit 74' to load bus RA-B.

Figure 14:
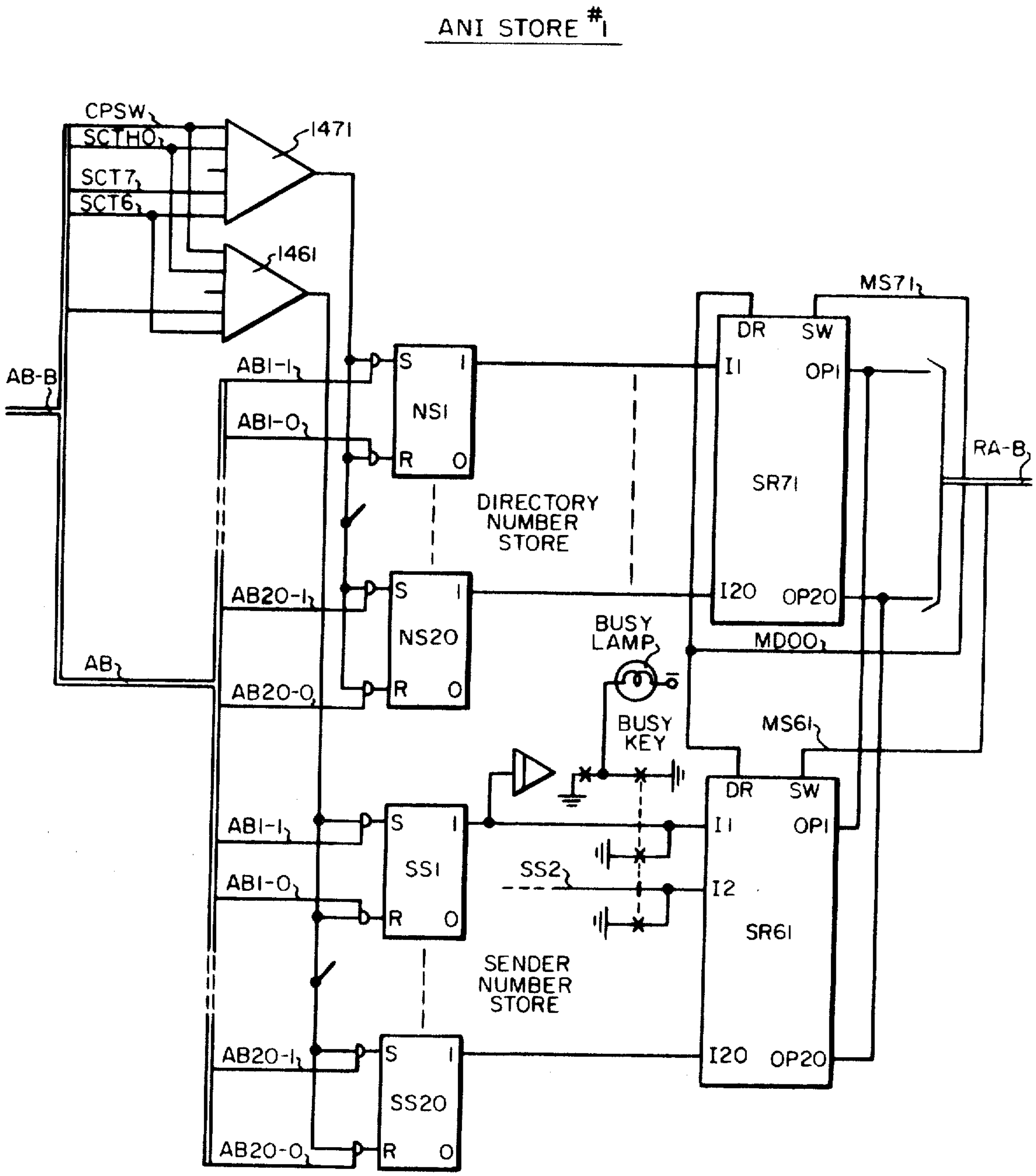
FIG. 14 is a functional block diagram of the stores associated with an automatic number identification unit.

The ANI (automatic number identification) store No. 1 1400, shown in FIG. 14, comprises a directory number store with flip-flops NS1-20, and a sender number store with flip-flops SS1-20. The input from the store bus AB-B is controlled by gated pulse amplifiers 1461 and 1471 respectively having decoded inputs from the store register SC, and a clock pulse input CPSW. The output is via the storage readout circuits SR61 and SR71 to the load bus RA-B, with memory driver and switch inputs.

The store address numbers for registers and senders, which use the memory driver C0 (the thousands and hundreds digits of the address) are as follows:

REGISTER NUMBERS (22 Registers)

| Reg. | DN | EN |
|---|---|---|
| 1 | C011 | C041 |
| . | . | . |
| . | . | . |
| 10 | C01θ | C04θ |
| 11 | C021 | C051 |
| . | . | . |
| . | . | . |
| 20 | C02θ | C05θ |
| 21 | C031 | C061 |
| 22 | C032 | C062 |

SENDERS (10 Senders)

| Sender | IS | DS No. 1 | DS No. 2 | EN | Spare |
|---|---|---|---|---|---|
| 1 | C071 | C072 | C073 | C074 | C075 |
| 2 | 81 | 82 | 83 | 84 | 85 |
| 3 | 91 | 92 | 93 | 94 | 95 |
| 4 | C0θ1 | C0θ2 | C0θ3 | C0θ4 | C0θ5 |
| 5 | B1 | B2 | B3 | B4 | B5 |
| 6 | 76 | 77 | 78 | 79 | 7θ |
| 7 | 86 | 87 | 88 | 89 | 8θ |
| 8 | 96 | 97 | 98 | 99 | 9θ |
| 9 | θ6 | θ7 | θ8 | θ9 | θθ |
| 10 | B6 | B7 | B8 | B9 | Bθ |

The various store addresses using the memory drivers MD00 (the thousands and hundreds digits) are as follows:

STORES UNITS

| TENS | 1 | 2 | 3 | 4 | 5 | 6 | 7 | 8 | 9 | θ | |
|---|---|---|---|---|---|---|---|---|---|---|---|
| 1 | MA | MB | MC | MD | ME | MF | TA | TB | TC | SN | – Marker Stores |
| 2 | SA | SB | SC | SD | | | | | | RG | – Temporary Stores |
| 3 | PA | PB | PC | PD | PE | PF | PG | PH | PJ | | – Printer Stores |
| 4 | XA | XB | XC | XD | | | | | TR | TD | – Rotary Switches |
| 5 | SALF | SART | | | | | | | | | |
| 6 | ANI #1 | ANI #2 | ANI #3 | ANI #4 | ANI #5 | ANI #6 | ANI #7 | ANI #8 | ANI #9 | ANI #10 | ANI Sender Number store |
| 7 | ANI #1 | ANI #2 | ANI #3 | ANI #4 | ANI #5 | ANI #6 | ANI #7 | ANI #8 | ANI #9 | ANI #10 | ANI Directory Number store |

The stores designated with an M are a part of the marker, the stores designated with a P are associated with the printer subsystem, the stores designated with an X are rotary switches on the control panel, stores TA, TB, and TC are peg count buffers, store TR is for a test routine request, and store TD is for the traffic distributor. The symbol RG is a register write mnemonic for the address 002θ, and the symbol SN is a sender write mnemonic for the address 001θ.

PROGRAMMING WITH INDIRECT ADDRESSING

To store information into one of the dial register directory or equipment number stores, the address of the store is first placed in the store register SB using the assembler instruction STORE SB, (machine instruction 20022), and then instruction STORE RG (machine instruction 2002θ) is used which in execution enables the gated pulse amplifier 442 to supply a pulse via lead CPRW to the gated pulse amplifiers of all of the dial register stores, the one designated by the tens and units digits decoded from store SB being enabled to store the data from the accumulator into the store addressed. Similarly to store data into any one of the sender stores or ANI stores, the address of the store is first placed in store register SC, using the instruction STORE SC (machine instruction 20023), and then the instruction STORE SN (machine instruction 2001θ) is used, which in execution enables the gated pulse amplifier 441 to gate a pulse via lead CPSW to all of the gated pulse amplifiers of the sender and ANI unit stores, the one with the decoded address digits from store SC being enabled to store the data from the accumulator AB via the store bus into the addressed store. To place data from any one of the register, sender, or ANI unit stores into the accumulator, the transfer operation code TRANS (OP3) is used. In this operation program instructions are first used to place the address of the desired store into the accumulator AB, and then the transfer operation instruction causes the data at that address to be read into the accumulator AB.

Note that with the indirect addressing technique described herein, it is not necessary in the program to use actual addresses of the stores of the registers, senders, or ANI units except for the first and in some cases the last numbered one. The program can be written in a loop with the store number appropriately incremented in performing various operations, and then the indirect addressing program technique for write-control, or the transfer operation for read-control, is used to write information into the appropriate store or read it out therefrom.

What is claimed is:

1. A digital data processing system controlled by a program and including a main memory for storing program words and data words, a first set of storage devices used as directory number storage registers and a second set of storage devices used as equipment number storage registers and further including a network for indirectly addressing said first and second sets of storage devices during an information storing operation,said network comprising:

input control gate means coupled to each storage device in said first and second sets of storage devices-,each of said input control gate means including a plurality of inputs and requiring the application of a predetermined address code to said inputs for enabling information to be stored in a selected one of either of said first or second sets of storage devices, temporary storage means for storing at least a part of the address code which selects said one of said storage devices, said temporary storage means including a temporary storage means input control gate having a plurality of inputs and outputs,a plurality of flip-flops coupled to said outputs,and an address decoding circuit coupled to said flip-flops,said decoding circuit coupled to said input control gate means for providing said part of said predetermined address signal to said inputs thereof;

special control gate means having a predetermined address distinct from any address of said main memory and distinct from said predetermined address codes of said input control gate means coupled to said first and second sets of storage devices, said special control gate means having an output coupled to each of said input control gate means for supplying the remaining part of said predetermined address code to each of said input control gate means; and, write control gate means coupled to said special control gate means and to said temporary storage means input control gate for enabling both thereof, whereby said first and second sets of storage devices are indirectly addressed when said special control gate means is enabled by an instruction in said program.

2. A digital data processing system, as in claim 1, wherein: said system is a communication switching system having a plurality of dialing registers, wherein each dialing register includes two of said storage devices,one providing storage for dialed digits,and the other providing storage for the calling line number.

3. A digital data processing system as in claim 2, wherein:

said main memory is a read only memory and all addressing arrangements are hard wired.

* * * * *